US012598012B2

(12) United States Patent
Metwaly Saad et al.

(10) Patent No.: US 12,598,012 B2
(45) Date of Patent: Apr. 7, 2026

(54) VIRTUAL CONTENT BASED AT LEAST IN PART ON RADIO FREQUENCY AND ENVIRONMENT CONDITIONS

(71) Applicant: QUALCOMM Incorporated, San Diego, CA (US)

(72) Inventors: Hussein Metwaly Saad, San Diego, CA (US); Peerapol Tinnakornsrisuphap, San Diego, CA (US); Simone Merlin, San Diego, CA (US); Belal Salama Amin Korany, San Diego, CA (US); Nikolai Konrad Leung, San Francisco, CA (US); Ananthapadmanabhan Arasanipalai Kandhadai, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 423 days.

(21) Appl. No.: 18/167,659

(22) Filed: Feb. 10, 2023

(65) Prior Publication Data

US 2023/0261775 A1 Aug. 17, 2023

Related U.S. Application Data

(60) Provisional application No. 63/267,997, filed on Feb. 14, 2022.

(51) Int. Cl.
| | |
|---|---|
| *H04B 17/391* | (2015.01) |
| *H04B 17/309* | (2015.01) |
| *H04W 36/00* | (2009.01) |

(52) U.S. Cl.
CPC ....... *H04B 17/3913* (2015.01); *H04B 17/309* (2015.01); *H04W 36/0085* (2018.08)

(58) Field of Classification Search
None
See application file for complete search history.

(56) References Cited

U.S. PATENT DOCUMENTS

| | | | | |
|---|---|---|---|---|
| 2014/0328423 A1* | 11/2014 | Agee | ..................... | H04W 52/42 |
| | | | | 375/267 |
| 2017/0228912 A1* | 8/2017 | Suzuki | ..................... | G09G 5/12 |
| 2017/0318519 A1 | 11/2017 | Belz et al. | | |
| 2021/0142526 A1 | 5/2021 | Mantyjarvi et al. | | |

(Continued)

OTHER PUBLICATIONS

Cirio G., et al., "The Magic Barrier Tape: a Novel Metaphor for Infinite Navigation in Virtual Words with a Restricted Walking Workspace", Proceedings of the 16th ACM Symposium on Virtual Reality Software and Technology, Nov. 18, 2009-Nov. 20, 2009, No. Kyoto, Japan, Nov. 18, 2009, pp. 155-162, XP055257460, 2 Penn Plaza, Suite 701 New York NY 10121-0701 USA.

(Continued)

*Primary Examiner* — Adolf Dsouza
(74) *Attorney, Agent, or Firm* — Harrity & Harrity, LLP

(57) ABSTRACT

An application server may receive information associated with reception quality at multiple locations of a physical environment. The application server may provide data for presenting a virtual environment by a UE in the physical environment, the data having one or more parameters based at least in part on a reception quality at a location associated with the UE in the physical environment.

30 Claims, 9 Drawing Sheets

(56)  References Cited

U.S. PATENT DOCUMENTS

2021/0409549 A1*  12/2021  Russell ................... H04L 67/56
2022/0303835 A1*   9/2022  Palle Venkata ..... H04W 36/087

OTHER PUBLICATIONS

International Search Report and Written Opinion—PCT/US2023/
062501—ISA/EPO—May 15, 2023.
Zhang X., et al., "Incentive Mechanisms for Mobile Crowdsensing
With Heterogeneous Sensing Costs", IEEE Transactions on Vehicu-
lar Technology, IEEE, USA, vol. 68, No. 4, Apr. 1, 2019, pp.
3992-4002, XP011719701.

* cited by examiner

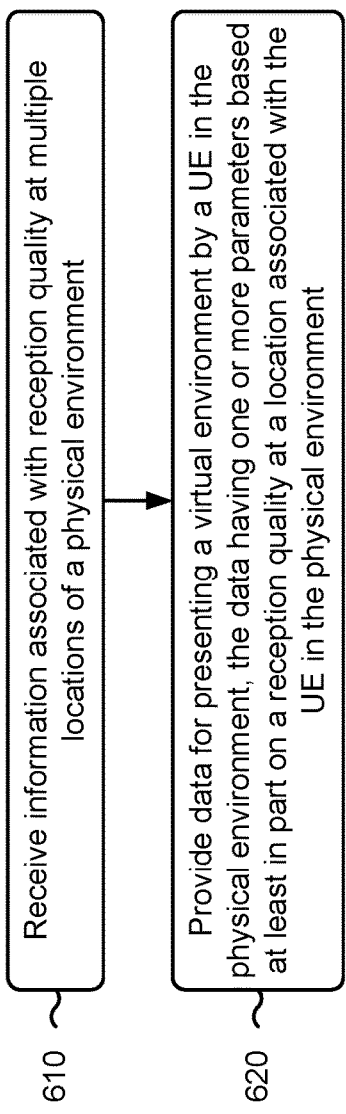
610  Receive information associated with reception quality at multiple locations of a physical environment
620  Provide data for presenting a virtual environment by a UE in the physical environment, the data having one or more parameters based at least in part on a reception quality at a location associated with the UE in the physical environment
600
FIG. 6

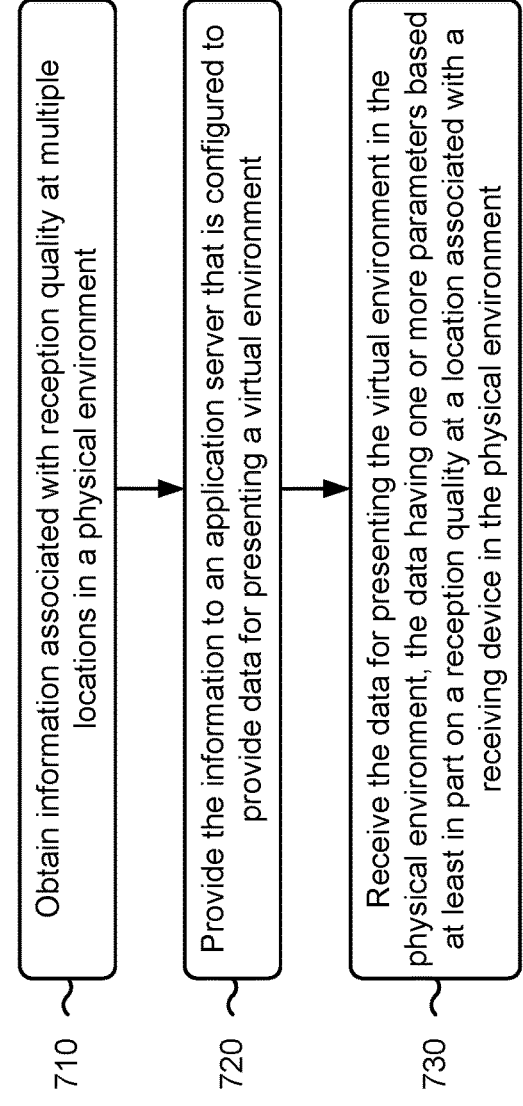

710　Obtain information associated with reception quality at multiple locations in a physical environment 720　Provide the information to an application server that is configured to provide data for presenting a virtual environment 730　Receive the data for presenting the virtual environment in the physical environment, the data having one or more parameters based at least in part on a reception quality at a location associated with a receiving device in the physical environment

VIRTUAL CONTENT BASED AT LEAST IN PART ON RADIO FREQUENCY AND ENVIRONMENT CONDITIONS

CROSS-REFERENCE TO RELATED APPLICATION

This Patent Application claims priority to U.S. Provisional Patent Application No. 63/267,997, filed on Feb. 14, 2022, entitled "VIRTUAL CONTENT BASED AT LEAST IN PART ON RADIO FREQUENCY AND ENVIRONMENT CONDITIONS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for virtual content based at least in part on radio frequency and environment conditions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by an application server. The method may include receiving information associated with reception quality at multiple locations of a physical environment. The method may include providing data for presenting a virtual environment by a user equipment (UE) in the physical environment, the data having one or more parameters based at least in part on a reception quality at a location associated with the UE in the physical environment.

Some aspects described herein relate to a method of wireless communication performed by a network node. The method may include obtaining information associated with reception quality at multiple locations in a physical environment. The method may include providing the information to an application server that is configured to provide data for presenting a virtual environment. The method may include receiving the data for presenting the virtual environment in the physical environment, the data having one or more parameters based at least in part on a reception quality at a location associated with a receiving device in the physical environment.

Some aspects described herein relate to an application server for wireless communication. The application server may include a memory and one or more processors coupled to the memory. The one or more processors may be configured to receive information associated with reception quality at multiple locations of a physical environment. The one or more processors may be configured to provide data for presenting a virtual environment by a UE in the physical environment, the data having one or more parameters based at least in part on a reception quality at a location associated with the UE in the physical environment.

Some aspects described herein relate to a network node for wireless communication. The network node may include a memory and one or more processors coupled to the memory. The one or more processors may be configured to obtain information associated with reception quality at multiple locations in a physical environment. The one or more processors may be configured to provide the information to an application server that is configured to provide data for presenting a virtual environment. The one or more processors may be configured to receive the data for presenting the virtual environment in the physical environment, the data having one or more parameters based at least in part on a reception quality at a location associated with a receiving device in the physical environment.

Some aspects described herein relate to a non-transitory computer-readable medium that stores a set of instructions for wireless communication by a one or more instructions that, when executed by one or more processors of an application server. The set of instructions, when executed by one or more processors of the one or more instructions that, when executed by one or more processors of an application server, may cause the one or more instructions that, when executed by one or more processors of an application server to receive information associated with reception quality at multiple locations of a physical environment. The set of instructions, when executed by one or more processors of the one or more instructions that, when executed by one or more processors of an application server, may cause the one or more instructions that, when executed by one or more processors of an application server to provide data for presenting a virtual environment by a UE in the physical environment, the data having one or more parameters based at least in part on a reception quality at a location associated with the UE in the physical environment.

Some aspects described herein relate to a non-transitory computer-readable medium that stores a set of instructions for wireless communication by a network node. The set of instructions, when executed by one or more processors of the network node, may cause the network node to obtain information associated with reception quality at multiple locations in a physical environment. The set of instructions, when executed by one or more processors of the network node, may cause the network node to provide the information to an application server that is configured to provide data for presenting a virtual environment. The set of instructions, when executed by one or more processors of the network node, may cause the network node to receive the data for presenting the virtual environment in the physical environment, the data having one or more parameters based at least in part on a reception quality at a location associated with a receiving device in the physical environment.

Some aspects described herein relate to an apparatus for wireless communication. The apparatus may include means for receiving information associated with reception quality at multiple locations of a physical environment. The apparatus may include means for providing data for presenting a virtual environment by a UE in the physical environment, the data having one or more parameters based at least in part on a reception quality at a location associated with the UE in the physical environment.

Some aspects described herein relate to an apparatus for wireless communication. The apparatus may include means for obtaining information associated with reception quality at multiple locations in a physical environment. The apparatus may include means for providing the information to an application server that is configured to provide data for presenting a virtual environment. The apparatus may include means for receiving the data for presenting the virtual environment in the physical environment, the data having one or more parameters based at least in part on a reception quality at a location associated with a receiving device in the physical environment.

Aspects generally include a method, apparatus, system, computer program product, non-transitory computer-readable medium, user equipment, base station, wireless communication device, and/or processing system as substantially described herein with reference to and as illustrated by the drawings, specification, and appendix.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 6-7 are diagrams illustrating example processes associated with virtual content modification based at least in part on radio frequency and environment conditions, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
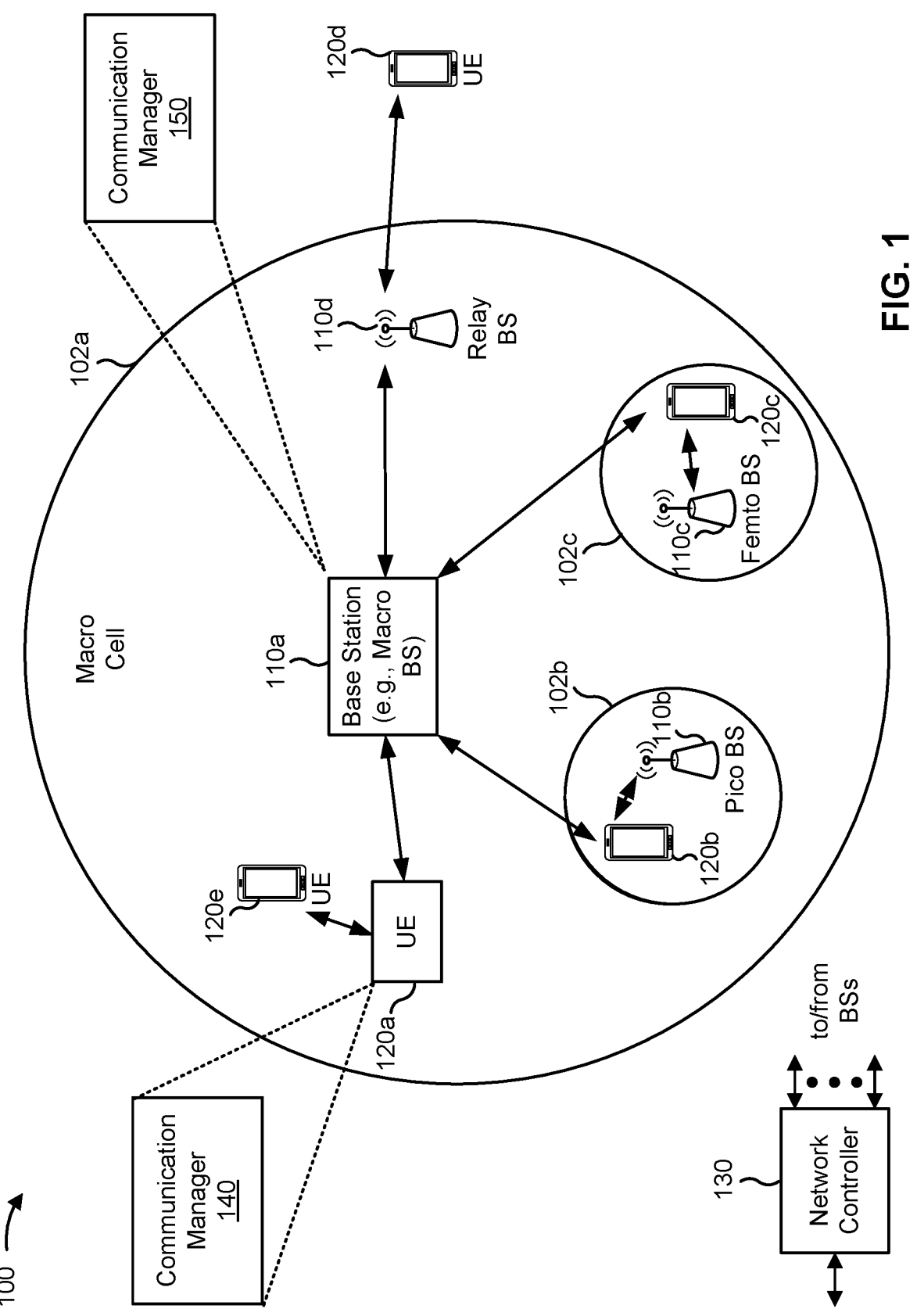
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, an application server may communication with one or more devices shown in FIG. 1 to provide data and/or to receive data. As described in more detail elsewhere herein, one or more components of the application server (e.g., described in connection with FIG. 6) may receive information associated with reception quality at multiple locations of a physical environment; and provide data for presenting a virtual environment by a UE in the physical environment, the data having one or more parameters based at least in part on a reception quality at a location associated with the UE in the physical environment. Additionally, or alternatively, one or more components of the application server may perform one or more other operations described herein.

In some aspects, a network node (e.g., a UE 120, a base station 110, and/or one or more devices of a disaggregated RAN), may include a communication manager 150 or 140. As described in more detail elsewhere herein, the communication manager 150 or 140 may obtain information associated with reception quality at multiple locations in a physical environment; provide the information to an application server that is configured to provide data for presenting a virtual environment; and receive the data for presenting the virtual environment in the physical environment, the data having one or more parameters based at least in part on a reception quality at a location associated with a receiving device in the physical environment. Additionally, or alternatively, the communication manager 150 or 140 may perform one or more other operations described herein.

In some aspects, the term "base station" (e.g., the base station 110) or "network node" or "network entity" may refer to an aggregated base station, a disaggregated base station (e.g., described in connection with FIG. 9), an integrated access and backhaul (IAB) node, a relay node, and/or one or more components thereof. For example, in some aspects, "base station," "network node," or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station," "network node," or "network entity" may refer to one device configured to perform one or more functions, such as those described herein in connection with the base station 110. In some aspects, the term "base station," "network node," or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station," "network node," or "network entity" may refer to any one or more of those different devices. In some aspects, the term "base station," "network node," or "network entity" may refer to one or more virtual base stations and/or one or more virtual base station functions. For example, in some aspects, two or more base station functions may be instantiated on a single device. In some aspects, the term "base station," "network node," or "network entity" may refer to one of the base station functions and not another. In this way, a single device may include more than one base station.

As indicated above, FIG. 1 is provided as an example. Other examples may differ from what is described with regard to FIG. 1.

Figure 2:
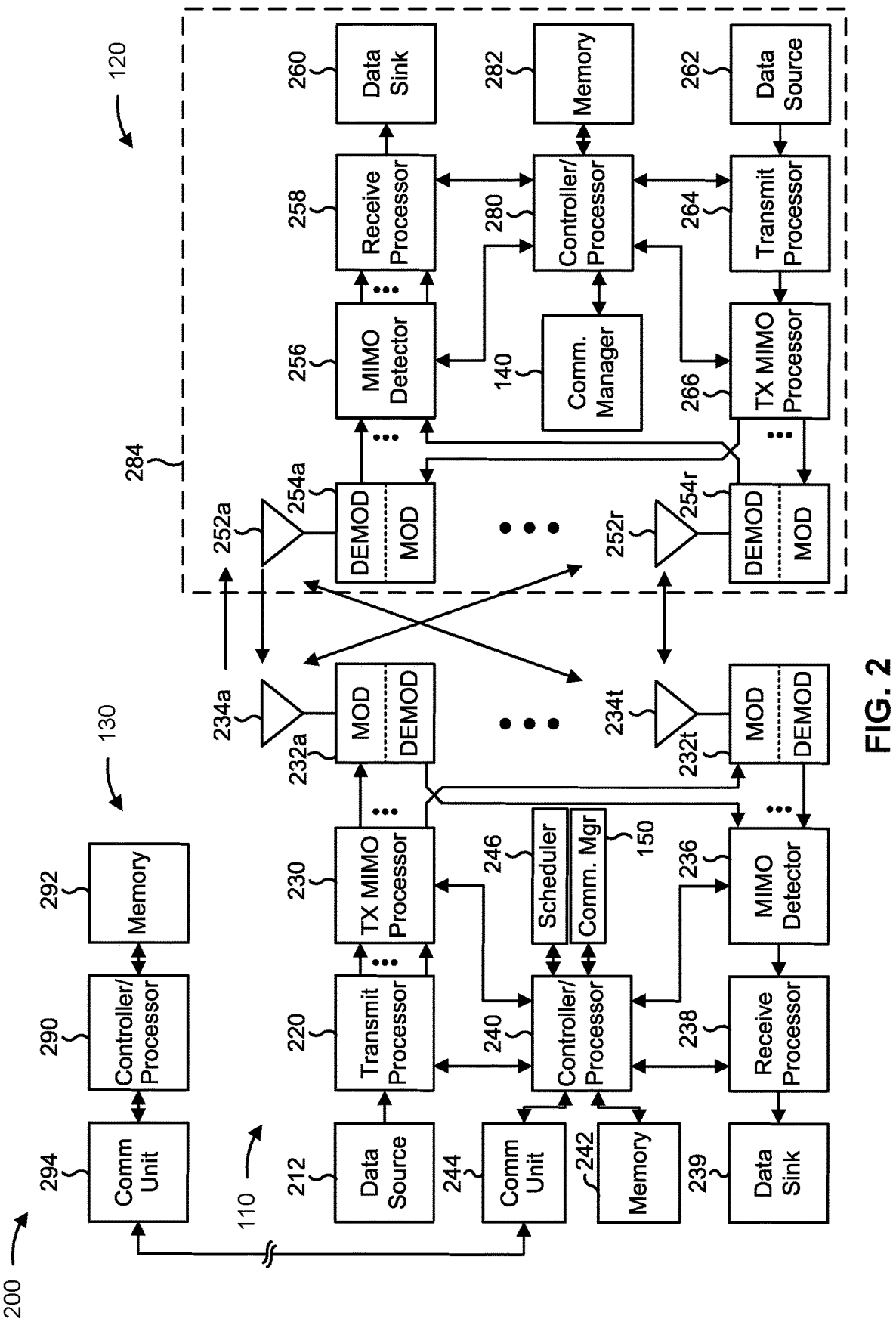
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-9).

The controller/processor 240 of the base station 110, the controller/processor 280 of the UE 120, and/or any other component(s) of FIG. 2 may perform one or more techniques associated with virtual content based at least in part on radio frequency and environment conditions, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, an application server includes means for receiving information associated with reception quality at multiple locations of a physical environment; and/or means for providing data for presenting a virtual environment by a UE in the physical environment, the data having one or more parameters based at least in part on a reception quality at a location associated with the UE in the physical environment. In some aspects, the means for the application server to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the application server to perform operations described herein may include, for example, one or more of processor 820, memory 830, input component 840, output component 850, or communication component 860, depicted in FIG. 8.

In some aspects, a network node (e.g., the base station 110) includes means for obtaining information associated with reception quality at multiple locations in a physical environment; means for providing the information to an application server that is configured to provide data for presenting a virtual environment; and/or means for receiving the data for presenting the virtual environment in the physical environment, the data having one or more parameters based at least in part on a reception quality at a location associated with a receiving device in the physical environment. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the network node to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
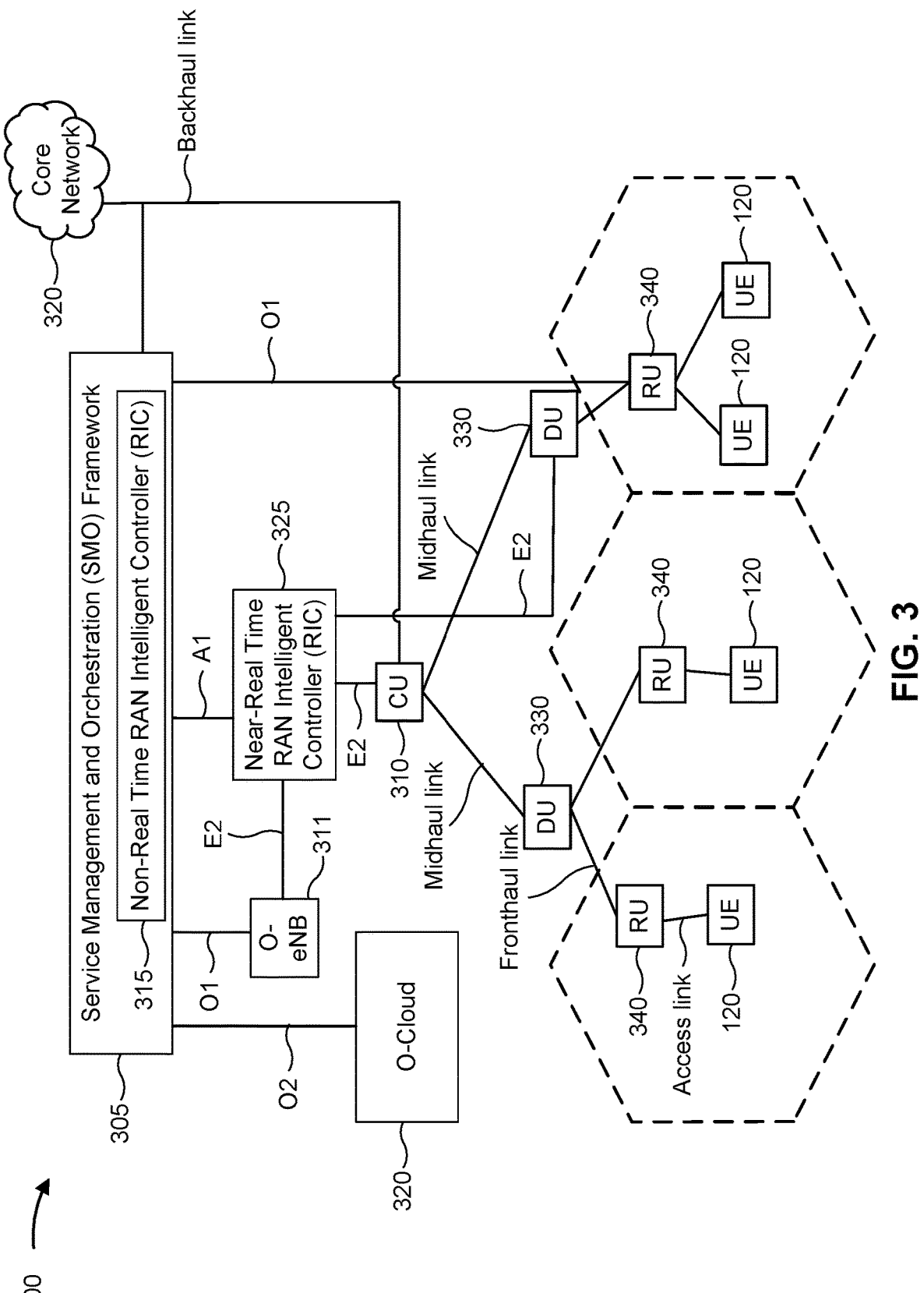
FIG. 3 is a diagram illustrating an example disaggregated base station architecture, in accordance with the present disclosure.

FIG. 3 is a diagram illustrating an example 300 disaggregated base station architecture, in accordance with the present disclosure.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual centralized unit (VCU), a virtual distributed unit (VDU), or a virtual radio unit (VRU).

Base station-type operation or network design may consider aggregation characteristics of base station functionality. For example, disaggregated base stations may be utilized in an IAB network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture shown in FIG. 3 may include one or more CUs 310 that can communicate directly with a core network 320 via a backhaul link, or indirectly with the core network 320 through one or more disaggregated base station units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUs 310, the DUs 330, the RUs 340), as well as the Near-RT RICs 325, the Non-RT RICs 315, and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low-PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Extended reality (XR), such as augmented reality and/or virtual reality, communication may require high performance wireless connections. For example, XR communication (e.g., associated with a metaverse or virtual reality environment) may use an extreme link capacity, may require relatively high reliability, and/or may require low latency. In some applications of XR, a receiving device (e.g., a UE or a display device) may receive XR data to display to a user, with the XR data depending on a location and/or orientation of the receiving device (e.g., to calibrate a displayed image to a pose of the receiving device).

The XR device may be free to move in a physical environment and/or in a corresponding virtual environment. However, objects in the physical environment may affect a reception quality at one or more locations. For example, the physical environment may allow a receiving device to move around an obstacle, but the obstacle may obstruct radio frequency signals to the receiving device, which may degrade reception of XR data. For example, the XR data may have a reduced throughput and/or a high packet loss rate that may increase a latency beyond a requirement for the XR communication (e.g., based at least in part on a service level agreement and/or a quality of service (QoS) requirement). This may cause, based at least in part on communication errors and/or dropped transport blocks, glitches and/or lag in a rendered virtual environment as presented by the UE or a device in communication with the UE.

In some aspects described herein, the UE and/or one or more network nodes (e.g., in communication with the UE) may provide information associated with reception quality at multiple locations of a physical environment. An application server associated with an XR application may provide data for a UE, that is located in the physical environment, to use for presenting a virtual environment. The data may have one or more parameters based at least in part on a reception quality at a location associated with the UE in the physical environment. In this way, the application server may adapt data associated with the XR application based at least in part on radio frequency parameters in the physical environment, which may conserve communication and/or network resources that may otherwise be consumed to detect and/or attempt to correct communication errors and/or dropped transport blocks. Additionally, or alternatively, the application server may provide the data with the one or more parameters that improve user experience based at least in part on reducing lag and/or glitching in the rendered virtual environment.

In the context of the present disclosure, a virtual environment may include a fully virtual environment that exists separately from a physical environment and/or an augmented reality environment where one or more features of the environment exist in the physical environment.

In an example scenario, the application server may add a virtual obstacle to a poor coverage area associated with relatively low reception quality (e.g., relative to other locations within the physical environment). The application server may identify a content area presented by the UE (e.g., based at least in part field of view or physical obstacles, among other examples). The application server may identify an area in the physical environment that is associated with poor coverage. The application server may add one or more virtual obstacles within the virtual environment to prevent or reduce a likelihood of the user moving to the area with poor coverage. In some aspects, the application server may generate new content or relocate existing content of the virtual environment to incentivize a user of the UE to move out of, or to avoid, poor coverage areas of the physical environment. Similarly, the application server may generate new content or relocate existing content of the virtual environment to incentivize a user of the UE to move into, or to remain in, good coverage areas of the physical environment In an example scenario, the application server may incentivize users based at least in part on coverage and capacity of a network provided by a network node. For example, the application server may identify coverage and wireless network capacity in a physical environment. The application may then identify a maximum number of UEs that can meet an quality threshold in areas within the physical environment. In some aspects, the application server may adjust content (e.g., adding interactive objects or incentives) to encourage a user of the UE to move to areas that can support the quality threshold.

In an example scenario, the application server may incentivize users of UEs based at least in part on RF conditions. For example, for UEs communicating at relatively high frequency ranges (e.g., millimeter waves), transmissions may be directional using beamforming. Receiver beams of the UEs need to point in a correct direction of a transmission beam to maintain a strong wireless link. In a UE, such as a head-mounted device, UE antenna orientations are affected by a head pose of a user. To improve a connection with the UE, the application server may adjust content of the virtual environment to incentivize a user to maintain an orientation of the UE associated with receiving a strong signal from a network node. For example, in an augmented reality (AR) or virtual reality (VR) virtual desktop setup, a heavy video streaming window may be pinned in a direction that leads the user to tilt the head in such a direction that the antenna can receive a strong wireless signal.

In an example scenario, the application server may incentivize users based at least in part on a need to explore certain locations to create an RF map. The application server may adjust the content of the virtual environment so that the user is incentivized to move to certain locations and/or orientations for which there are not yet sufficiently accurate RF characterizations. This encourages exploration of the physical environment. During this time, the content may be adapted to allow for a possible sudden link degradation (e.g. by using low resolution video) based at least in part on exploring areas of the physical environment for which the application server is unaware of reception quality.

In an example scenario, the application server may determine the coverage area from multiple network nodes and identify handover regions associated with the multiple network nodes. The application server may create content for each user that either confines the user under coverage of a single network node, incentivizes the user to stay away from a handover region, and/or creates content for UEs that does not require UE to move between coverage areas of multiple network nodes.

In an example scenario, the application server may attempt to reduce or avoid blockage from a hand, arm or other body part of a user of the UE. In relatively high frequency ranges, objects along a receiving beam path can cause significant signal blockage. To avoid or reduce this blockage, the application server may create content in the virtual environment (e.g. virtual control buttons, or interactive windows) in such a way that resulting user hand gestures do not interfere with signal reception (e.g., the hand gestures are not encouraged to be in the direction of actual or potential receiving beams).

Incentives in the virtual environment may include an object to collect or interact with, an indication of high-reception-quality locations associated with an application used by the UE, spatial audio to draw attention of users to good coverage areas and good orientations of the UE, and/or a navigation direction or instruction.

Figure 4:
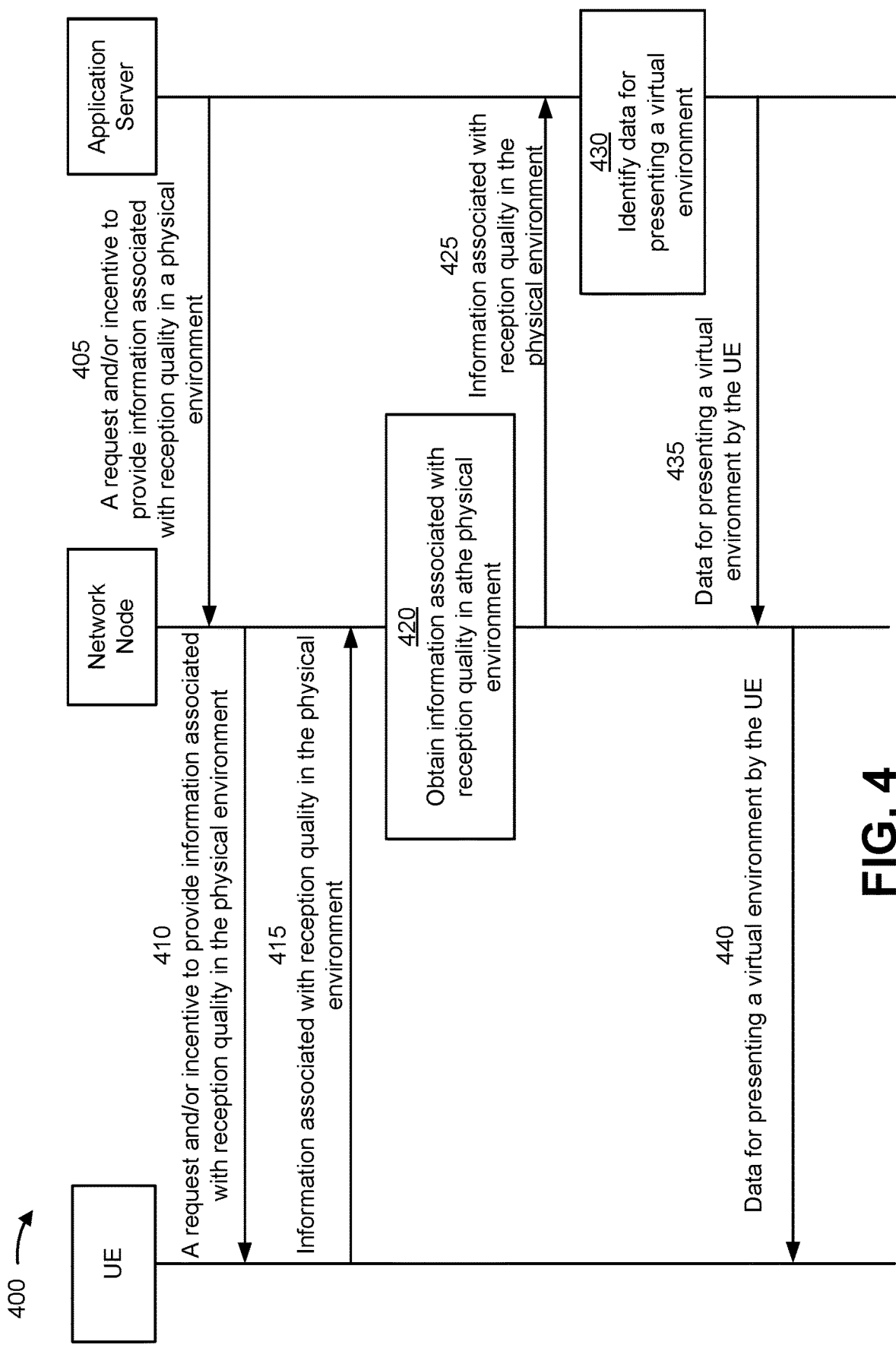
FIGS. 4-5 are diagrams of examples associated with virtual content based at least in part on radio frequency and environment conditions, in accordance with the present disclosure

FIG. 4 is a diagram of an example 400 associated with virtual content based at least in part on radio frequency and environment conditions, in accordance with the present disclosure. As shown in FIG. 4, a network node and an application server (e.g., via the network node) may communicate with a UE (e.g., UE 120). The network node may include one or more base stations 110, one or more CUs, one or more DUs, one or more RUs, one or more core network nodes, one or more network servers, one or more application servers, and/or one or more Access and Mobility Management Functions (AMFs), among other examples. In some aspects, the UE and the network node may be part of a wireless network (e.g., wireless network 100). The UE and the network node may have established a wireless connection prior to operations shown in FIG. 4.

As shown by reference number 405, the application server may provide, and the network node may receive, a request and/or an incentive to provide information associated with reception quality in a physical environment. In some aspects, the request may be directed to the network node or to the UE. In some aspects, the incentive may be directed to the UE. The information may be requested for multiple locations of the physical environment and/or orientations of the UE in the multiple locations of the physical environment.

In some aspects, the application server may provide the request and/or the incentive based at least in part on a desire to identify or update locations of the physical environment associated with different reception qualities.

As shown by reference number 410, the network node may transmit, and the UE may receive, a request and/or an incentive to provide information associated with reception quality in a physical environment. In some aspects, the UE may measure reception quality at a current location of the UE and/or may identify locations likely to have poor reception within the physical environment (e.g., using a sensor such as a camera, lidar, radar, or other object detection device, among other examples).

In some aspects, the request and/or incentive described in connection with reference number 410 may be based at least in part on, identical to, or independent from (e.g., in the absence of) the request and/or incentive described in connection with reference number 405.

As shown by reference number 415, the UE may transmit, and the network node may receive, information associated with reception quality in a physical environment. The reception quality may be associated with a capacity of the network for communication. The capacity may be based at least in part on received power and traffic within a network, within coverage of an RU of the network node, or within coverage of a beam.

In some aspects, the information may include indications of measured reception quality at a current location of the UE, measured reception qualities at past locations of the UE, and/or locations expected to have poor radio quality or good radio quality (e.g., relative to other locations within the physical environment), among other examples. In some aspects, the information may be based at least in part on measurements by a device in communication with the UE or one or more devices that currently communicate or previously communicated within the physical environment (e.g., in communication with a device that is in communication with the UE). In some aspects, the one or more devices may include an edge node or a core network node, among other examples.

In some aspects, the information may be associated with a validity time after which the information is invalid. In some aspects, the information may indicate the validity time, the validity time may be configured by the application server, and/or the validity time may be associated with the physical environment (e.g., with a relatively short validity time in a physical environment that changes relatively frequently).

In some aspects, the information may include a radio quality heat map (e.g., showing good and poor reception quality over a coverage area), static information associated with the reception quality at the multiple locations of the physical environment, and/or dynamic information associated with the reception quality at the multiple locations of the physical environment.

In some aspects, the information may include an indication of a predicted radio frequency blockage at one or more of the multiple locations, an indication of one or more locations of one or more objects within the physical environment, and/or reception quality at the multiple locations based at least in part on one or more orientations of the UE, among other examples.

As shown by reference number 420, the network node may obtain information associated with reception quality in the physical environment. In some aspects, the information may include information obtained from the UE, from other UEs, from other network nodes, and/or directly by the network node.

As shown by reference number 425, the network node may provide, and the application server may receive, the information associated with reception quality in the physical environment. In some aspects, the network node may provide a full set of information obtained by the network node (e.g., directly or via another device, such as the UE) or may provide an aggregated set of the information. For example, the network node may provide information obtained from a single UE or may generate a heat map based at least in part on measurements of one or more UEs and/or the network node, among other examples.

In some aspects, the information may be associated with handover disruptions associated within the physical environment. In some aspects, the information associated with the handover disruptions may be obtained from feedback from UEs and/or communication with neighbor nodes.

As shown by reference number 430, the application server may identify data for presenting a virtual environment (e.g., by the UE). In some aspects, the application server may identify modifications to an existing virtual environment, with the modifications configured to reduce a likelihood of the UE experiencing poor reception quality. In some aspects, the data may have one or more parameters based at least in part on a reception quality at a location associated with the UE in the physical environment. In some aspects, the data may include a stream of data for presentation of the virtual environment over a period of time (e.g., not only an instance in time).

In some aspects, the data for presenting the virtual environment by the UE in the physical environment may include providing an area of interest at a first virtual location of the virtual environment that is associated with a first location of the physical environment. The first location of the physical environment may be away from a second location of the physical environment associated with a reception quality that fails to satisfy a threshold.

In some aspects, the data for presenting the virtual environment by the UE in the physical environment may include directional instructions relative to a current location of the UE, a virtual barrier in the virtual environment that is between the UE and a second virtual location associated with the second location of the physical environment, and/or an incentive to move to or remain in a location associated with relatively high reception quality or capacity.

In some aspects, the data for presenting the virtual environment by the UE in the physical environment may include data with a bitrate that is based at least in part on (e.g., proportional to) a reception quality at a location associated with the UE and/or one or more types of data that are based at least in part on a reception quality at a location associated with the UE.

In some aspects, the one or more parameters may include an incentive or an instruction that encourages avoidance of user movement that would obstruct a beam path. For example, the one or more parameters may provide an object for interaction at an location that discourages a user from moving a hand into a beam path for receiving the data.

As shown by reference number 435, the application server may provide, and the network node may receive, the data for presenting a virtual environment by the UE.

As shown by reference number 440, the network node may transmit, and the UE may receive, the data for presenting a virtual environment by the UE.

Based at least in part on the application server providing data for the UE with one or more parameters based at least in part on a reception quality at a location associated with the UE in the physical environment, the application server may adapt data associated with the XR application based at least in part on radio frequency parameters in the physical environment. This may conserve communication and/or network resources that may otherwise be consumed to detect and/or attempt to correct communication errors and/or dropped transport blocks. Additionally, or alternatively, the application server may provide the data with the one or more parameters that improve user experience based at least in part on reducing lag and/or glitching in the rendered virtual environment.

As indicated above, FIG. 4 is provided as an example. Other examples may differ from what is described with respect to FIG. 4.

Figure 5:
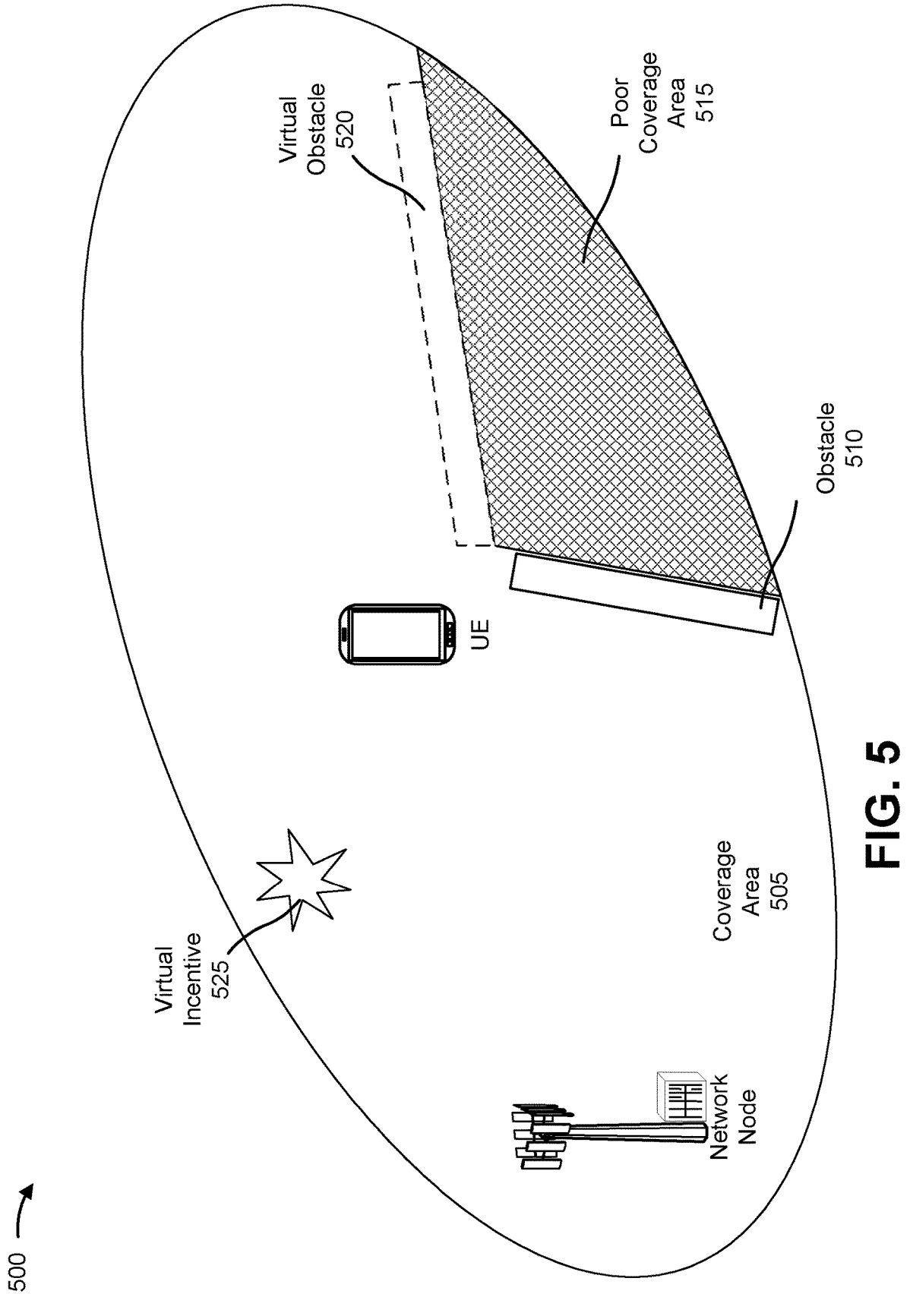

FIG. 5 is a diagram of an example 500 associated with virtual content based at least in part on radio frequency and environment conditions, in accordance with the present disclosure. A network node and an application server (e.g., via the network node) may communicate with a UE (e.g., UE 120) in context of FIG. 5. The network node may include one or more base stations 110, one or more CUs, one or more DUs, one or more RUs, one or more core network nodes, one or more network servers, one or more application servers, and/or one or more AMFs, among other examples. In some aspects, the UE and the network node may be part of a wireless network (e.g., wireless network 100). The UE and the network node may have established a wireless connection prior to operations shown in FIG. 5.

As shown in FIG. 5, the network node may be associated with a coverage area 505 in which the network node provides a network connection to UEs. The coverage area 505 may include an obstacle 510 in the physical environment that causes a poor coverage area 515 within the coverage area 505. The UE and/or the network node, among other examples, may provide an indication of the obstacle 510 and/or the poor coverage area 515 to an application server associated a virtual reality and/or augmented reality application executed by the UE. The UE and the application server may be in communication via the network node as a service provided by the application server to the UE.

Based at least in part on the obstacle 510 and/or the poor coverage area 515, the application server may provide data for presentation of the virtual environment via the UE, with the data having one or more parameters that discourage movement of the UE to the poor coverage area 515. For example, the one or more parameters may include providing a virtual obstacle 520 in the virtual environment or providing a virtual incentive 525 to attract a user of the UE away from the poor coverage area 515.

FIG. 6 is a diagram illustrating an example process 600 performed, for example, by an application server, in accordance with the present disclosure. Example process 600 is an example where the application server performs operations associated with virtual content modification based at least in part on radio frequency and environment conditions.

As shown in FIG. 6, in some aspects, process 600 may include receiving information associated with reception quality at multiple locations of a physical environment (block 610). For example, the application server (e.g., using input component 840 and/or communication component 860, depicted in FIG. 8) may receive information associated with reception quality at multiple locations of a physical environment, as described above.

As further shown in FIG. 6, in some aspects, process 600 may include providing data for presenting a virtual environment by a UE in the physical environment, the data having one or more parameters based at least in part on a reception quality at a location associated with the UE in the physical environment (block 620). For example, the application (e.g., using output component 850 and/or communication component 860, depicted in FIG. 8) may provide data for presenting a virtual environment by a UE in the physical environment, the data having one or more parameters based at least in part on a reception quality at a location associated with the UE in the physical environment, as described above.

Process 600 may include additional aspects, such as any single aspect or any combination of aspects described below and/or in connection with one or more other processes described elsewhere herein.

In a first aspect, the information comprises a radio quality heat map, static information associated with the reception quality at the multiple locations of the physical environment, or dynamic information associated with the reception quality at the multiple locations of the physical environment.

In a second aspect, alone or in combination with the first aspect, the information is based at least in part on measurements by one or more of the UE, a device in communication with the UE, or one or more devices that communicate within the physical environment.

In a third aspect, alone or in combination with one or more of the first and second aspects, the one or more devices that communicate within the physical environment comprise one or more of an edge node, or a core network node.

In a fourth aspect, alone or in combination with one or more of the first through third aspects, the information is associated with a validity time after which the information is invalid.

In a fifth aspect, alone or in combination with one or more of the first through fourth aspects, the information includes an indication of the validity time.

In a sixth aspect, alone or in combination with one or more of the first through fifth aspects, providing the data for presenting the virtual environment by the UE in the physical environment comprises one or more of providing an area of interest at a first virtual location of the virtual environment that is associated with a first location of the physical environment that is away from a second location of the physical environment associated with a reception quality that fails to satisfy a threshold, providing directional instructions relative to a current location of the UE, providing a virtual barrier in the virtual environment that is between the UE and a second virtual location associated with the second location of the physical environment, providing an incentive to move to or remain in a location associated with relatively high reception quality or capacity, providing the data with a bitrate that is based at least in part on a reception quality at a location associated with the UE, or providing one or more types of data based at least in part on a reception quality at a location associated with the UE.

In a seventh aspect, alone or in combination with one or more of the first through sixth aspects, the information comprises an indication of a predicted radio frequency blockage at one or more of the multiple locations, an indication of one or more locations of one or more objects within the physical environment, or quality at the multiple locations based at least in part on one or more orientations of the UE.

In an eighth aspect, alone or in combination with one or more of the first through seventh aspects, process 600 includes providing a request for the information, wherein receiving the information is based at least in part on providing the request for the information, or providing an incentive, in the virtual environment, to explore the physical environment and provide the information.

In a ninth aspect, alone or in combination with one or more of the first through eighth aspects, one or more of the reception quality or the one or more parameters are based at least in part on an orientation of the UE.

In a tenth aspect, alone or in combination with one or more of the first through ninth aspects, the one or more parameters include an incentive or an instruction that encourages avoidance of user movement that would obstruct a beam path.

In an eleventh aspect, alone or in combination with one or more of the first through tenth aspects, the information is associated with handover disruptions associated with at least one of the multiple locations of the physical environment.

In a twelfth aspect, alone or in combination with one or more of the first through eleventh aspects, the reception quality is associated with a capacity.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a diagram illustrating an example process 700 performed, for example, by a network node, in accordance with the present disclosure. Example process 700 is an example where the network node (e.g., base station 110, CU 310, DU 330, and/or RU 340) performs operations associated with virtual content modification based at least in part on radio frequency and environment conditions.

As shown in FIG. 7, in some aspects, process 700 may include obtaining information associated with reception quality at multiple locations in a physical environment (block 710). For example, the network node (e.g., using reception component 902 and/or communication manager 906, depicted in FIG. 9) may obtain information associated with reception quality at multiple locations in a physical environment, as described above.

As further shown in FIG. 7, in some aspects, process 700 may include providing the information to an application server that is configured to provide data for presenting a virtual environment (block 720). For example, the network node (e.g., using communication manager 906, depicted in FIG. 9) may provide the information to an application server that is configured to provide data for presenting a virtual environment, as described above.

As further shown in FIG. 7, in some aspects, process 700 may include receiving the data for presenting the virtual environment in the physical environment, the data having one or more parameters based at least in part on a reception quality at a location associated with a receiving device in the physical environment (block 730). For example, the network node (e.g., using reception component 902 and/or communication manager 906, depicted in FIG. 9) may receive the data for presenting the virtual environment in the physical environment, the data having one or more parameters based at least in part on a reception quality at a location associated with a receiving device in the physical environment, as described above.

Process 700 may include additional aspects, such as any single aspect or any combination of aspects described below and/or in connection with one or more other processes described elsewhere herein.

In a first aspect, obtaining the information comprises identifying one or more objects within the physical environment, identifying one or more locations, of the multiple locations, at which reception quality is expected to satisfy a threshold, identifying portions of the physical environment associated with different beams, identifying directions of beams associated with the one or more communications, performing raytracing simulation within the physical environment, receiving an indication of reception quality associated with multiple additional locations in a neighbor physical environment, receiving information associated with the one or more objects from an additional network node, or receiving information associated with the one or more locations at which reception quality is expected to satisfy a threshold from the additional network node.

In a second aspect, alone or in combination with the first aspect, the network node comprises a UE, a radio frequency network node, an edge node, or a core network network node.

In a third aspect, alone or in combination with one or more of the first and second aspects, the information comprises a radio quality heat map, static information associated with the reception quality at the multiple locations of the physical environment, or dynamic information associated with the reception quality at the multiple locations of the physical environment.

In a fourth aspect, alone or in combination with one or more of the first through third aspects, process 700 includes providing the data to a UE for displaying the virtual environment, or providing to a display device for displaying the virtual environment.

In a fifth aspect, alone or in combination with one or more of the first through fourth aspects, the information is based at least in part on measurements by one or more of a UE configured to receive the data for presenting the virtual environment, a device in communication with the UE, or one or more devices that communicate within the physical environment.

In a sixth aspect, alone or in combination with one or more of the first through fifth aspects, the one or more devices that communicate within the physical environment comprise one or more of an edge node, or a core network node.

In a seventh aspect, alone or in combination with one or more of the first through sixth aspects, the information is associated with a validity time after which the information is invalid.

In an eighth aspect, alone or in combination with one or more of the first through seventh aspects, the information includes an indication of the validity time.

In a ninth aspect, alone or in combination with one or more of the first through eighth aspects, receiving the data for presenting the virtual environment in the physical environment comprises one or more of receiving an indication of an area of interest at a first virtual location of the virtual environment that is associated with a first location of the physical environment that is away from a second location of the physical environment associated with a reception quality that fails to satisfy a threshold, receiving directional instructions relative to a current location of a UE configured for displaying the virtual environment, receiving an indication of a virtual barrier in the virtual environment that is between the UE configured for displaying the virtual environment and a second virtual location associated with the second location of the physical environment, receiving an incentive for the UE to move to or remain in a location associated with relatively high reception quality or capacity, receiving the data with a bitrate that is based at least in part on a reception quality at a location associated with the UE, or receiving one or more types of data based at least in part on a reception quality at a location associated with the UE.

In a tenth aspect, alone or in combination with one or more of the first through ninth aspects, the information comprises an indication of a predicted radio frequency blockage at one or more of the multiple locations, an indication of one or more locations of one or more objects within the physical environment, or quality at the multiple locations based at least in part on one or more orientations of the UE.

In an eleventh aspect, alone or in combination with one or more of the first through tenth aspects, process 700 includes receiving a request for the information, wherein receiving the information is based at least in part on providing the request for the information, or providing an incentive, in the virtual environment, to explore the physical environment and provide the information.

In a twelfth aspect, alone or in combination with one or more of the first through eleventh aspects, one or more of the reception quality or the one or more parameters are based at least in part on an orientation of a UE configured to receive the data for presenting the virtual environment.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
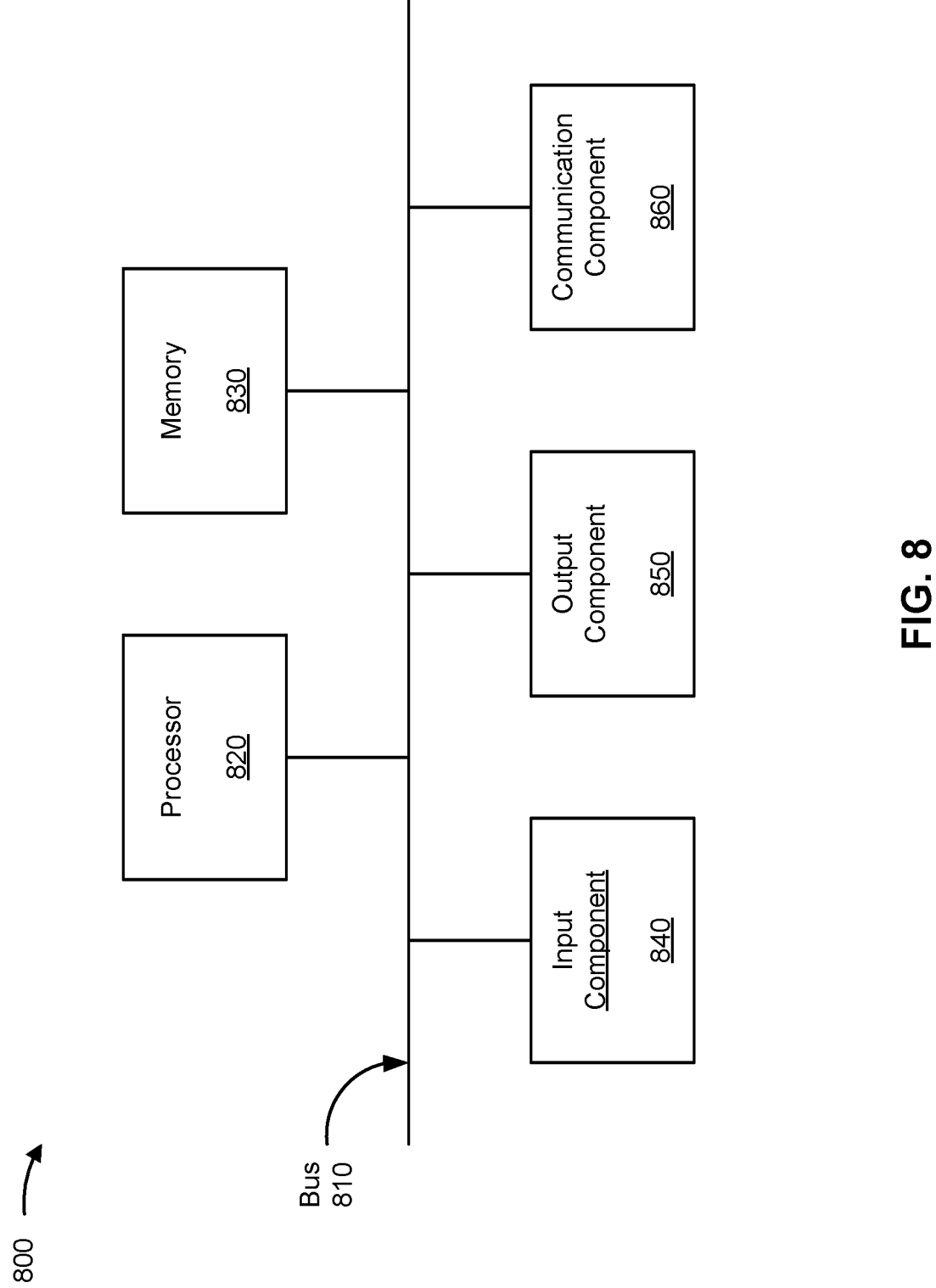
FIGS. 8-9 are diagrams of example apparatuses for wireless communication, in accordance with the present disclosure.

FIG. 8 is a diagram of example components of a device 800 associated with virtual content based at least in part on radio frequency and environment conditions. The device 800 may correspond to an application server. In some implementations, then application server may include one or more devices 800 and/or one or more components of the device 800. As shown in FIG. 8, the device 800 may include a bus 810, a processor 820, a memory 830, an input component 840, an output component 850, and/or a communication component 860.

The bus 810 may include one or more components that enable wired and/or wireless communication among the components of the device 800. The bus 810 may couple together two or more components of FIG. 8, such as via operative coupling, communicative coupling, electronic coupling, and/or electric coupling. For example, the bus 810 may include an electrical connection (e.g., a wire, a trace, and/or a lead) and/or a wireless bus. The processor 820 may include a central processing unit, a graphics processing unit, a microprocessor, a controller, a microcontroller, a digital signal processor, a field-programmable gate array, an application-specific integrated circuit, and/or another type of processing component. The processor 820 may be implemented in hardware, firmware, or a combination of hardware and software. In some implementations, the processor 820 may include one or more processors capable of being programmed to perform one or more operations or processes described elsewhere herein.

The memory 830 may include volatile and/or nonvolatile memory. For example, the memory 830 may include random access memory (RAM), read only memory (ROM), a hard disk drive, and/or another type of memory (e.g., a flash memory, a magnetic memory, and/or an optical memory). The memory 830 may include internal memory (e.g., RAM, ROM, or a hard disk drive) and/or removable memory (e.g., removable via a universal serial bus connection). The memory 830 may be a non-transitory computer-readable medium. The memory 830 may store information, one or more instructions, and/or software (e.g., one or more software applications) related to the operation of the device 800. In some implementations, the memory 830 may include one or more memories that are coupled (e.g., communicatively coupled) to one or more processors (e.g., processor 820), such as via the bus 810. Communicative coupling between a processor 820 and a memory 830 may enable the processor 820 to read and/or process information stored in the memory 830 and/or to store information in the memory 830.

The input component 840 may enable the device 800 to receive input, such as user input and/or sensed input. For example, the input component 840 may include a touch screen, a keyboard, a keypad, a mouse, a button, a microphone, a switch, a sensor, a global positioning system sensor, an accelerometer, a gyroscope, and/or an actuator. The output component 850 may enable the device 800 to provide output, such as via a display, a speaker, and/or a light-emitting diode. The communication component 860 may enable the device 800 to communicate with other devices via a wired connection and/or a wireless connection. For example, the communication component 860 may include a receiver, a transmitter, a transceiver, a modem, a network interface card, and/or an antenna.

The device 800 may perform one or more operations or processes described herein. For example, a non-transitory computer-readable medium (e.g., memory 830) may store a set of instructions (e.g., one or more instructions or code) for execution by the processor 820. The processor 820 may execute the set of instructions to perform one or more operations or processes described herein. In some implementations, execution of the set of instructions, by one or more processors 820, causes the one or more processors 820 and/or the device 800 to perform one or more operations or processes described herein. In some implementations, hard-wired circuitry may be used instead of or in combination with the instructions to perform one or more operations or processes described herein. Additionally, or alternatively, the processor 820 may be configured to perform one or more operations or processes described herein. Thus, implementations described herein are not limited to any specific combination of hardware circuitry and software.

The number and arrangement of components shown in FIG. 8 are provided as an example. The device 800 may include additional components, fewer components, different components, or differently arranged components than those shown in FIG. 8. Additionally, or alternatively, a set of components (e.g., one or more components) of the device 800 may perform one or more functions described as being performed by another set of components of the device 800.

Figure 9:
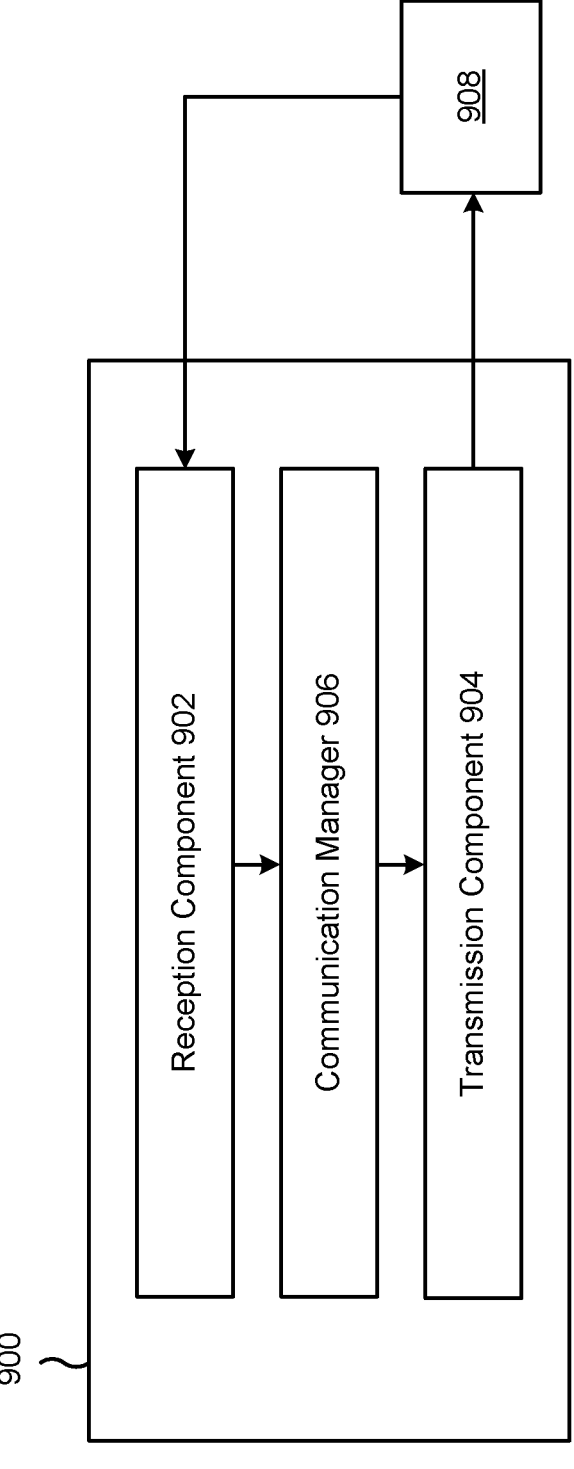

FIG. 9 is a diagram of an example apparatus 900 for wireless communication, in accordance with the present disclosure. The apparatus 900 may be a network node, or a network node may include the apparatus 900. In some aspects, the apparatus 900 includes a reception component 902, a transmission component 904, and/or a communication manager 906, which may be in communication with one another (for example, via one or more buses and/or one or more other components). In some aspects, the communication manager 906 is the communication manager 150 described in connection with FIG. 1. As shown, the apparatus 900 may communicate with another apparatus 908, such as a UE or a network node (such as a CU, a DU, an RU, or a base station), using the reception component 902 and the transmission component 904.

In some aspects, the apparatus 900 may be configured to perform one or more operations described herein in connection with FIGS. 4-5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the network node described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 908. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the network node described in connection with FIG. 2. In some aspects, the reception component 902 and/or the transmission component 904 may include or may be included in a network interface. The network interface may be configured to obtain and/or output signals for the apparatus 900 via one or more communications links, such as a backhaul link, a midhaul link, and/or a fronthaul link.

The transmission component 904 may transmit communications, such as reference signals, control information, data communications, or a combination thereof, to the apparatus 908. In some aspects, one or more other components of the apparatus 900 may generate communications and may provide the generated communications to the transmission component 904 for transmission to the apparatus 908. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 904 may include one or more antennas, a modem, a modulator, a transmit MIMO processor, a transmit processor, a controller/processor, a memory, or a combination thereof, of the network node described in connection with FIG. 2. In some aspects, the transmission component 904 may be co-located with the reception component 902 in a transceiver.

The communication manager 906 may support operations of the reception component 902 and/or the transmission component 904. For example, the communication manager 906 may receive information associated with configuring reception of communications by the reception component 902 and/or transmission of communications by the transmission component 904. Additionally, or alternatively, the communication manager 906 may generate and/or provide control information to the reception component 902 and/or the transmission component 904 to control reception and/or transmission of communications.

The reception component 902 may obtain information associated with reception quality at multiple locations in a physical environment. The communication manager 906 may provide the information to an application server that is configured to provide data for presenting a virtual environment. The reception component 902 may receive the data for presenting the virtual environment in the physical environment, the data having one or more parameters based at least in part on a reception quality at a location associated with a receiving device in the physical environment.

The communication manager 906 may provide the data to a UE for displaying the virtual environment.

The communication manager 906 may provide to a display device for displaying the virtual environment.

The reception component 902 may receive a request for the information wherein receiving the information is based at least in part on providing the request for the information, or providing an incentive, in the virtual environment, to explore the physical environment and provide the information.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by an application server, comprising: receiving information associated with reception quality at multiple locations of a physical environment; and providing data for presenting a virtual environment by a UE in the physical environment, the data having one or more parameters based at least in part on a reception quality at a location associated with the UE in the physical environment.

Aspect 2: The method of Aspect 1, wherein the information comprises: a radio quality heat map, static information associated with the reception quality at the multiple locations of the physical environment, or dynamic information associated with the reception quality at the multiple locations of the physical environment.

Aspect 3: The method of any of Aspects 1-2, wherein the information is based at least in part on measurements by one or more of: the UE, a device in communication with the UE, or one or more devices that communicate within the physical environment.

Aspect 4: The method of Aspect 3, wherein the one or more devices that communicate within the physical environment comprise one or more of: an edge node, or a core network node.

Aspect 5: The method of any of Aspects 1-4, wherein the information is associated with a validity time after which the information is invalid.

Aspect 6: The method of Aspect 5, wherein the information includes an indication of the validity time.

Aspect 7: The method of any of Aspects 1-6, wherein providing the data for presenting the virtual environment by the UE in the physical environment comprises one or more of: providing an area of interest at a first virtual location of the virtual environment that is associated with a first location of the physical environment that is away from a second location of the physical environment associated with a reception quality that fails to satisfy a threshold; providing directional instructions relative to a current location of the UE; providing a virtual barrier in the virtual environment that is between the UE and a second virtual location associated with the second location of the physical environment; providing an incentive to move to or remain in a location associated with relatively high reception quality or capacity, providing the data with a bitrate that is based at least in part on a reception quality at a location associated with the UE; or providing one or more types of data based at least in part on a reception quality at a location associated with the UE.

Aspect 8: The method of any of Aspects 1-7, wherein the information comprises: an indication of a predicted radio frequency blockage at one or more of the multiple locations, an indication of one or more locations of one or more objects within the physical environment, or reception quality at the multiple locations based at least in part on one or more orientations of the UE.

Aspect 9: The method of any of Aspects 1-8, further comprising: providing a request for the information, wherein receiving the information is based at least in part on providing the request for the information, or providing an incentive, in the virtual environment, to explore the physical environment and provide the information.

Aspect 10: The method of any of Aspects 1-9, wherein one or more of the reception quality or the one or more parameters are based at least in part on an orientation of the UE.

Aspect 11: The method of any of Aspects 1-10, wherein the one or more parameters include an incentive or an instruction that encourages avoidance of user movement that would obstruct a beam path.

Aspect 12: The method of any of Aspects 1-11, wherein the information is associated with handover disruptions associated with at least one of the multiple locations of the physical environment.

Aspect 13: The method of any of Aspects 1-12, wherein the reception quality is associated with a capacity.

Aspect 14: A method of wireless communication performed by a network node, comprising: obtaining information associated with reception quality at multiple locations in a physical environment; providing the information to an application server that is configured to provide data for presenting a virtual environment; and receiving the data for presenting the virtual environment in the physical environment, the data having one or more parameters based at least in part on a reception quality at a location associated with a receiving device in the physical environment.

Aspect 15: The method of Aspect 14, wherein obtaining the information comprises: identifying one or more objects within the physical environment; identifying one or more locations, of the multiple locations, at which reception quality is expected to satisfy a threshold; identifying portions of the physical environment associated with different beams; identifying directions of beams associated with the one or more communications; performing raytracing simulation within the physical environment; receiving an indication of reception quality associated with multiple additional locations in a neighbor physical environment; receiving information associated with the one or more objects from an additional network node; or receiving information associated with the one or more locations at which reception quality is expected to satisfy a threshold from the additional network node.

Aspect 16: The method of any of Aspects 14-15, wherein the network node comprises: a user equipment (UE), a radio frequency network node, an edge node, or a core network node.

Aspect 17: The method of any of Aspects 14-16, wherein the information comprises: a radio quality heat map, static information associated with the reception quality at the multiple locations of the physical environment, or dynamic information associated with the reception quality at the multiple locations of the physical environment.

Aspect 18: The method of any of Aspects 14-17, further comprising: providing the data to a user equipment (UE) for displaying the virtual environment, or providing to a display device for displaying the virtual environment.

Aspect 19: The method of any of Aspects 14-18, wherein the information is based at least in part on measurements by one or more of: a user equipment (UE) configured to receive the data for presenting the virtual environment, a device in communication with the UE, or one or more devices that communicate within the physical environment.

Aspect 20: The method of Aspect 19, wherein the one or more devices that communicate within the physical environment comprise one or more of: an edge node, or a core network node.

Aspect 21: The method of any of Aspects 14-20, wherein the information is associated with a validity time after which the information is invalid.

Aspect 22: The method of Aspect 21, wherein the information includes an indication of the validity time.

Aspect 23: The method of any of Aspects 14-22, wherein receiving the data for presenting the virtual environment in the physical environment comprises one or more of: receiving an indication of an area of interest at a first virtual location of the virtual environment that is associated with a first location of the physical environment that is away from a second location of the physical environment associated with a reception quality that fails to satisfy a threshold; receiving directional instructions relative to a current location of a user equipment (UE) configured for displaying the virtual environment; receiving an indication of a virtual barrier in the virtual environment that is between the UE configured for displaying the virtual environment and a second virtual location associated with the second location of the physical environment; receiving an incentive for the UE to move to or remain in a location associated with relatively high reception quality or capacity, receiving the data with a bitrate that is based at least in part on a reception quality at a location associated with the UE; or receiving one or more types of data based at least in part on a reception quality at a location associated with the UE.

Aspect 24: The method of any of Aspects 14-23, wherein the information comprises: an indication of a predicted radio frequency blockage at one or more of the multiple locations, an indication of one or more locations of one or more objects within the physical environment, or reception quality at the multiple locations based at least in part on one or more orientations of the UE.

Aspect 25: The method of any of Aspects 14-24, further comprising: receiving a request for the information, wherein receiving the information is based at least in part on providing the request for the information, or providing an incentive, in the virtual environment, to explore the physical environment and provide the information.

Aspect 26: The method of any of Aspects 14-25, wherein one or more of the reception quality or the one or more parameters are based at least in part on an orientation of a user equipment (UE) configured to receive the data for presenting the virtual environment.

Aspect 27: An apparatus for wireless communication at a device, comprising a processor; memory coupled with the processor; and instructions stored in the memory and executable by the processor to cause the apparatus to perform the method of one or more of Aspects 1-26.

Aspect 28: A device for wireless communication, comprising a memory and one or more processors coupled to the memory, the one or more processors configured to perform the method of one or more of Aspects 1-26.

Aspect 29: An apparatus for wireless communication, comprising at least one means for performing the method of one or more of Aspects 1-26.

Aspect 30: A non-transitory computer-readable medium storing code for wireless communication, the code comprising instructions executable by a processor to perform the method of one or more of Aspects 1-26.

Aspect 31: A non-transitory computer-readable medium storing a set of instructions for wireless communication, the set of instructions comprising one or more instructions that, when executed by one or more processors of a device, cause the device to perform the method of one or more of Aspects 1-26.

The foregoing disclosure provides illustration and description but is not intended to be exhaustive or to limit the aspects to the precise forms disclosed. Modifications and variations may be made in light of the above disclosure or may be acquired from practice of the aspects.

Further disclosure is included in the appendix. The appendix is provided as an example only and is to be considered part of the specification. A definition, illustration, or other description in the appendix does not supersede or override similar information included in the detailed description or figures. Furthermore, a definition, illustration, or other description in the detailed description or figures does not supersede or override similar information included in the appendix. Furthermore, the appendix is not intended to limit the disclosure of possible aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An application server for wireless communication, comprising:
one or more memories; and
one or more processors coupled to the one or more memories, the one or more processors individually or collectively configured to:
receive information associated with reception quality at multiple locations of a physical environment; and
provide data for presenting a virtual environment by a user equipment (UE) in the physical environment, the data having one or more parameters based at least in part on a reception quality at a location associated with the UE in the physical environment, wherein the one or more processors, to provide the data for presenting the virtual environment by the UE in the physical environment, are configured to:
provide a virtual barrier in the virtual environment that is between the UE and a virtual location associated with a reception quality that fails to satisfy a threshold.

2. The application server of claim 1, wherein the information comprises:
a radio quality heat map,
static information associated with the reception quality at the multiple locations of the physical environment, or
dynamic information associated with the reception quality at the multiple locations of the physical environment.

3. The application server of claim 1, wherein the information is based at least in part on measurements by one or more of:
the UE,
a device in communication with the UE, or
one or more devices that communicate within the physical environment.

4. The application server of claim 3, wherein the one or more devices that communicate within the physical environment comprise one or more of:
an edge node, or
a core network node.

5. The application server of claim 1, wherein the information is associated with a validity time after which the information is invalid.

6. The application server of claim 5, wherein the information includes an indication of the validity time.

7. The application server of claim 1, wherein content of the virtual environment confines the UE to a coverage area of a network node.

8. The application server of claim 1, wherein the information comprises:
an indication of a predicted radio frequency blockage at one or more of the multiple locations,
an indication of one or more locations of one or more objects within the physical environment, or
reception quality based at least in part on one or more orientations of the UE.

9. The application server of claim 1, wherein the one or more processors are further configured to:

provide a request for the information,
wherein receiving the information is based at least in part on providing the request for the information, or
provide an incentive, in the virtual environment, to explore the physical environment and provide the information.

10. The application server of claim 1, wherein one or more of the reception quality at the multiple locations of the physical environment or the one or more parameters are based at least in part on an orientation of the UE.

11. The application server of claim 1, wherein the one or more parameters include an incentive or an instruction that encourages avoidance of user movement that would obstruct a beam path.

12. The application server of claim 1, wherein the information is associated with handover disruptions associated with at least one of the multiple locations of the physical environment.

13. The application server of claim 1, wherein the reception quality at the multiple locations of the physical environment is associated with a capacity.

14. The application server of claim 1, wherein
content of the virtual environment incentivizes movement of the UE to one or more locations associated with an absence of a type of radio frequency characterizations.

15. A network node for wireless communication, comprising:
one or more memories; and
one or more processors coupled to the one or more memories, the one or more processors individually or collectively configured to:
obtain information associated with reception quality at multiple locations in a physical environment;
provide the information to an application server that is configured to provide data for presenting a virtual environment; and
receive the data for presenting the virtual environment in the physical environment, the data having one or more parameters based at least in part on a reception quality at a location associated with a receiving device in the physical environment, wherein the one or more processors, to receive the data for presenting the virtual environment in the physical environment, are configured to:
receive an indication of a virtual barrier in the virtual environment that is between a user equipment (UE) and a virtual location associated with a reception quality that fails to satisfy a threshold.

16. The network node of claim 15, wherein the one or more processors, to obtain the information, are configured to:
identify one or more objects within the physical environment;
identify one or more locations, of the multiple locations, at which reception quality at the one or more locations is expected to satisfy the threshold;
identify portions of the physical environment associated with different beams;
identify directions of beams associated with the one or more communications;
perform raytracing simulation within the physical environment;
receive an indication of reception quality associated with multiple additional locations in a neighbor physical environment;
receive information associated with the one or more objects from an additional network node; or receive information associated with the one or more locations at which reception quality is expected to satisfy the threshold from the additional network node.

17. The network node of claim 15, wherein the network node comprises:

an other UE, a radio frequency network node, an edge node, or a core network network node.

18. The network node of claim 15, wherein the information comprises:

a radio quality heat map, static information associated with the reception quality at the multiple locations of the physical environment, or dynamic information associated with the reception quality at the multiple locations of the physical environment.

19. The network node of claim 15, wherein the one or more processors are further configured to:

provide the data to the UE for displaying the virtual environment, or provide the data to a display device for displaying the virtual environment.

20. The network node of claim 15, wherein the information is based at least in part on measurements by one or more of:

the UE, a device in communication with the UE, or one or more devices that communicate within the physical environment.

21. The network node of claim 20, wherein the one or more devices that communicate within the physical environment comprise one or more of:

an edge node, or a core network node.

22. The network node of claim 15, wherein the information is associated with a validity time after which the information is invalid.

23. The network node of claim 22, wherein the information includes an indication of the validity time.

24. The network node of claim 15, wherein content of the virtual environment confines the UE to a coverage area of the network node.

25. The network node of claim 15, wherein the information comprises:

an indication of a predicted radio frequency blockage at one or more of the multiple locations, an indication of one or more locations of one or more objects within the physical environment, or reception quality based at least in part on one or more orientations of the UE.

26. The network node of claim 15, wherein the one or more processors are further configured to:

receive a request for the information, wherein receiving the information is based at least in part on providing the request for the information, or provide an incentive, in the virtual environment, to explore the physical environment and provide the information.

27. The network node of claim 15, wherein one or more of the reception quality at the multiple locations of the physical environment or the one or more parameters are based at least in part on an orientation of the UE.

28. A method of wireless communication performed by an application server, comprising:

receiving information associated with reception quality at multiple locations of a physical environment; and providing data for presenting a virtual environment by a user equipment (UE) in the physical environment, the data having one or more parameters based at least in part on a reception quality at a location associated with the UE in the physical environment, wherein providing the data for presenting the virtual environment comprises:

providing a virtual barrier in the virtual environment that is between the UE and a virtual location associated with a reception quality that fails to satisfy a threshold.

29. The method of claim 28, wherein the information comprises:

a radio quality heat map, static information associated with the reception quality at the multiple locations of the physical environment, or dynamic information associated with the reception quality at the multiple locations of the physical environment.

30. A method of wireless communication performed by a network node, comprising:

obtaining information associated with reception quality at multiple locations in a physical environment;

providing the information to an application server that is configured to provide data for presenting a virtual environment; and receiving the data for presenting the virtual environment in the physical environment, the data having one or more parameters based at least in part on a reception quality at a location associated with a receiving device in the physical environment, wherein receiving the data for presenting the virtual environment comprises:

receiving an indication of a virtual barrier in the virtual environment that is between a user equipment (UE) and a virtual location associated with a reception quality that fails to satisfy a threshold.

* * * * *